(12) United States Patent
Sato

(10) Patent No.: US 9,385,830 B2
(45) Date of Patent: Jul. 5, 2016

(54) TRANSMITTER MODULE OUTPUTTING WAVELENGTH MULTIPLEXED LIGHT

(71) Applicant: Sumitomo Electric Industries, Ltd., Osaka-shi (JP)

(72) Inventor: Shunsuke Sato, Yokohama (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 14/534,956

(22) Filed: Nov. 6, 2014

(65) Prior Publication Data

US 2015/0132001 A1    May 14, 2015

(30) Foreign Application Priority Data

Nov. 8, 2013   (JP) .................................. 2013-232092

(51) Int. Cl.
*H04B 10/04* (2006.01)
*H04J 14/02* (2006.01)
*H04B 10/50* (2013.01)

(52) U.S. Cl.
CPC .............. *H04J 14/02* (2013.01); *H04B 10/504* (2013.01); *H04B 10/506* (2013.01)

(58) Field of Classification Search
CPC .. H04B 10/503; H04B 10/504; H04B 10/506; H04J 14/02
USPC .......................................................... 398/182
See application file for complete search history.

(56) References Cited

U.S. PATENT DOCUMENTS

| | | | |
|---|---|---|---|
| 6,590,916 B2* | 7/2003 | Eden | H01S 5/4031 327/108 |
| 6,816,529 B2* | 11/2004 | Vail | H01S 5/4025 372/38.02 |
| 7,274,343 B2* | 9/2007 | Kim | G09G 3/2965 315/169.1 |
| 8,346,037 B2 | 1/2013 | Pezeshki et al. | |
| 2012/0269522 A1* | 10/2012 | Kagaya | H01P 3/026 398/183 |

* cited by examiner

*Primary Examiner* — M. R. Sedighian
(74) *Attorney, Agent, or Firm* — Venable LLP; Michael A. Sartori; Laura G. Remus

(57) ABSTRACT

A transmitter module having a plurality of semiconductor laser diodes (LDs) as optical sources that emit optical respective optical beams with specific wavelengths different from other is disclosed. The transmitter module includes, in addition to the LDs, a driver to drive LDs in the shunt-driving configuration. Inductors through which the bias currents for the LDs are provided are mounted on the driver as interposing a spacer and a top carrier.

15 Claims, 16 Drawing Sheets

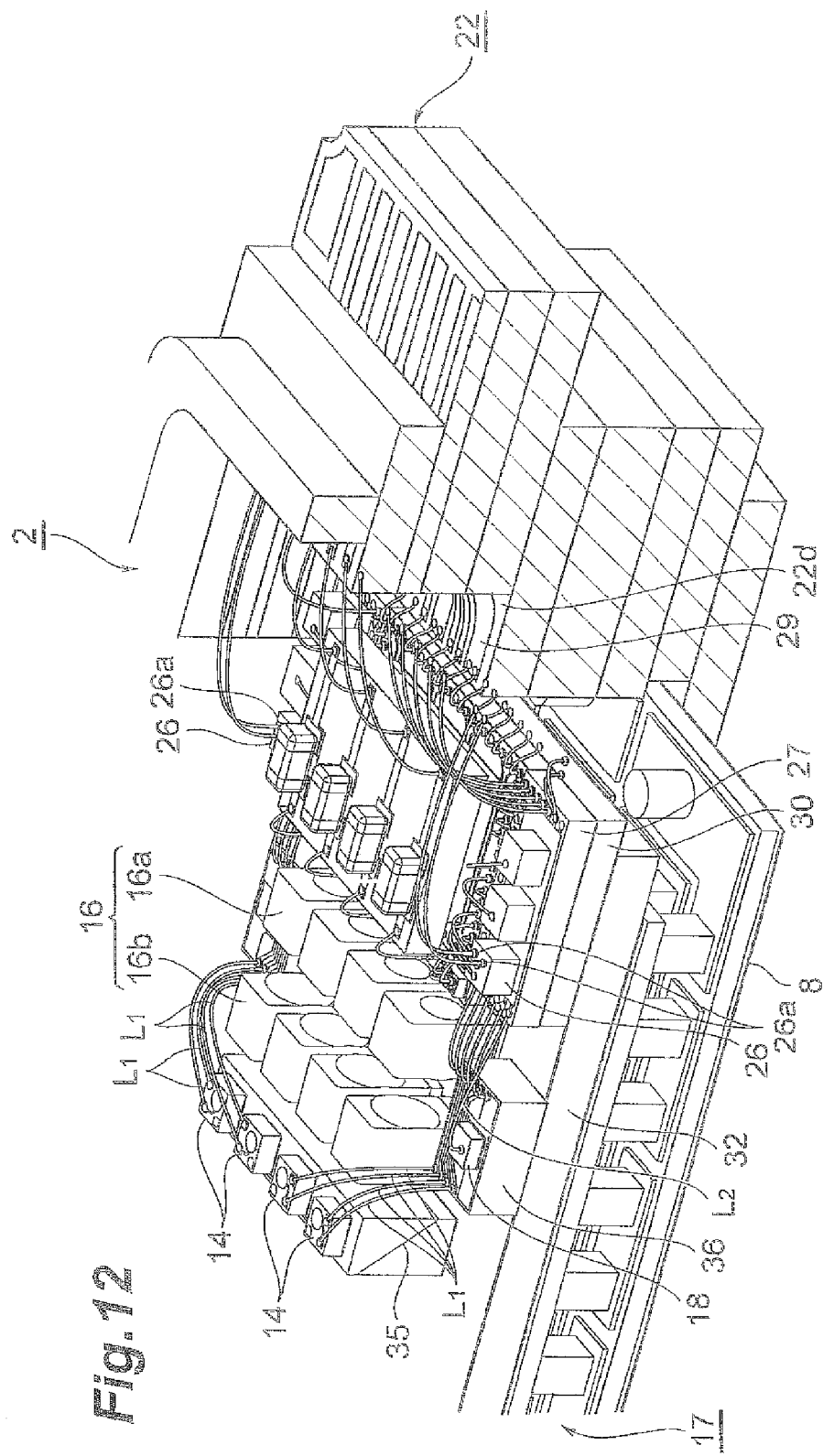

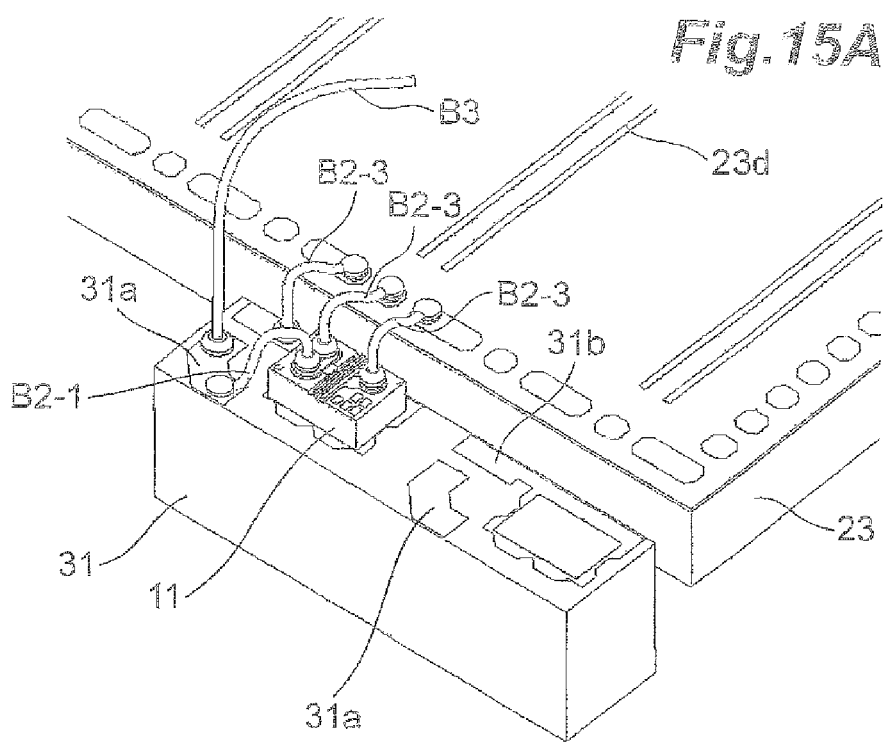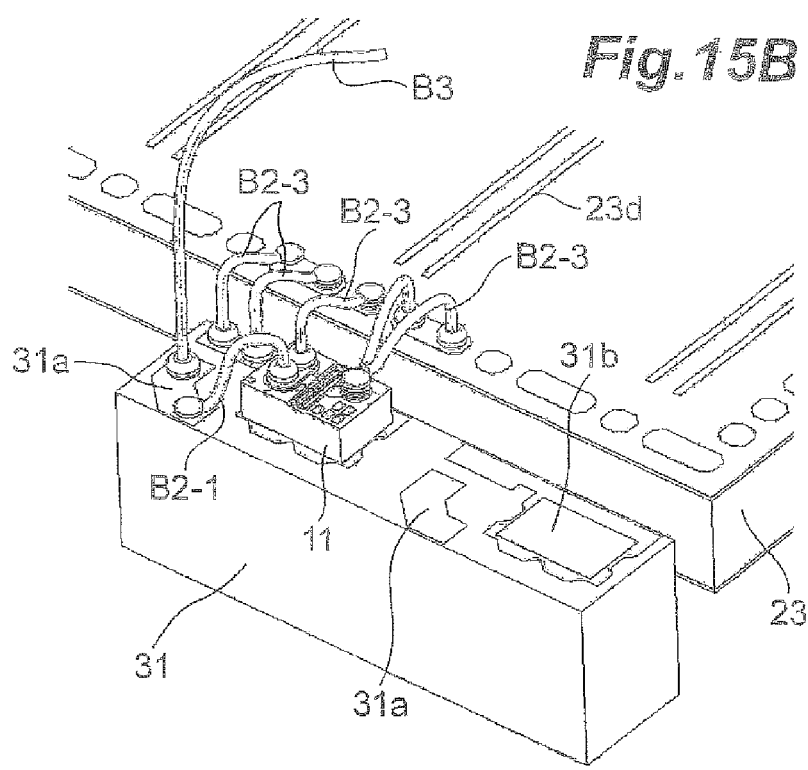

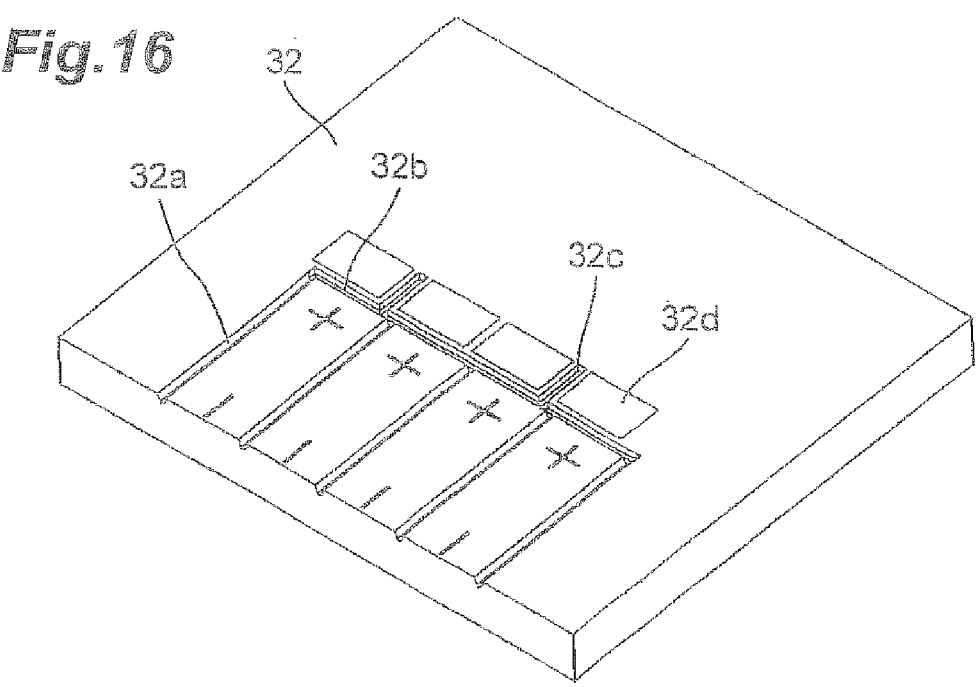

TRANSMITTER MODULE OUTPUTTING WAVELENGTH MULTIPLEXED LIGHT

BACKGROUND OF THE INVENTION

1. Field of the Invention

The present application relates to a transmitter optical module, in particular, a transmitter optical module having a plurality of optical signal sources.

2. Background Arts

An optical transmitter module that installs four laser diodes (herein after denoted as LDs) each emitting an optical beam with a specific wavelength different from others has been known in the field. In order to driver LDs installed within such a transmitter module, active devices, typically in integrated circuit (IC) implementing driver circuits to driver respective LDs, and passive devices of capacitors and inductors are inevitably installed within a housing of the transmitter module. In particular, when the operational speed of the LDs exceeds 10 Gbps, or reaches 25 Gbps, the assembly of such active and passive devices becomes a key factor for the transmitter module to show the designed performance. Moreover, recent trend for active optical components such an optical transceiver has continuously requested subjects inconsistent to each other, that is, the housing in the dimensions thereof is as small as possible, while, the performance or the operational speed thereof is as fast as possible.

In order to realize the operational speed exceeding 10 Gbps, the bonding wires connecting electrical components in the transmitter module should be short as possible. In other words, the electrical components are necessary to be positioned such that the bonding wires become shortest. A longer bonding wire causes an increase of the transmission impedance and degrades the high frequency performance of the transmitter module. The present application is to provide an arrangement of the components in the housing, by which the bonding wires effectively become shortest.

SUMMARY OF THE INVENTION

The present application relates to a transmitter module that includes a plurality of LDs, a driver, a top carrier, and a box-shaped housing. The LDs each emits an optical beam attributed to a specific wavelength different from others. The driver includes a plurality of driving circuits corresponding to respective LDs to driver the LDs. The top carrier mounts a plurality of inductors, where the bias currents are provided to the LDs through respective inductors. The box-shaped housing encloses the LDs, the driver, and the top carrier therein. A feature of the transmitter module is that the driver mounts the top carrier thereon.

In another aspect of the transmitter module of the present application, the transmitter module includes an LD, a driver, an LD sub-mount, and a housing. The LD includes a cathode electrode and an anode electrode, where both of the electrodes are exposed in a top surface of the LD. The driver has a signal pad and a ground pad. The LD sub-mount, which is made of electrically insulating material, has the relay pad and the die-pad. The relay pad relays the bias current to the LD, and the die-pad mounts the LD thereon. The housing encloses the LD, the driver, and the LD sub-mount therein; and provides the chassis ground. A feature of the transmitter module of the present application is that the anode electrode of the LD is wire-bonded to the signal pad of the driver through the relay pad on the LD sub-mount, and the cathode electrode of the LD is directly wire-bonded to the ground pad of the driver without being connected to the chassis ground of the housing.

BRIEF DESCRIPTION OF THE DRAWINGS

The foregoing and other purposes, aspects and advantages will be better understood from the following detailed description of a preferred embodiment of the invention with reference to the drawings, in which:

FIG. 12 is also a perspective view of the portion to shows the bonding wires;

FIGS. 15A and 15B perspective views of the arrangement around the LD according to the modified embodiments of the present application; and FIG. 16 is a perspective view of the carrier mounting the LD sub-mount and the driver through the IC sub-mount.

DESCRIPTION OF EMBODIMENTS

Next, some embodiments of a transmitter module of the present application will be described as referring to drawings. In the description of the drawings, numerals or symbols same with or similar to each other will refer to the elements same with or similar to each other without duplicating explanations.

Figure 1:
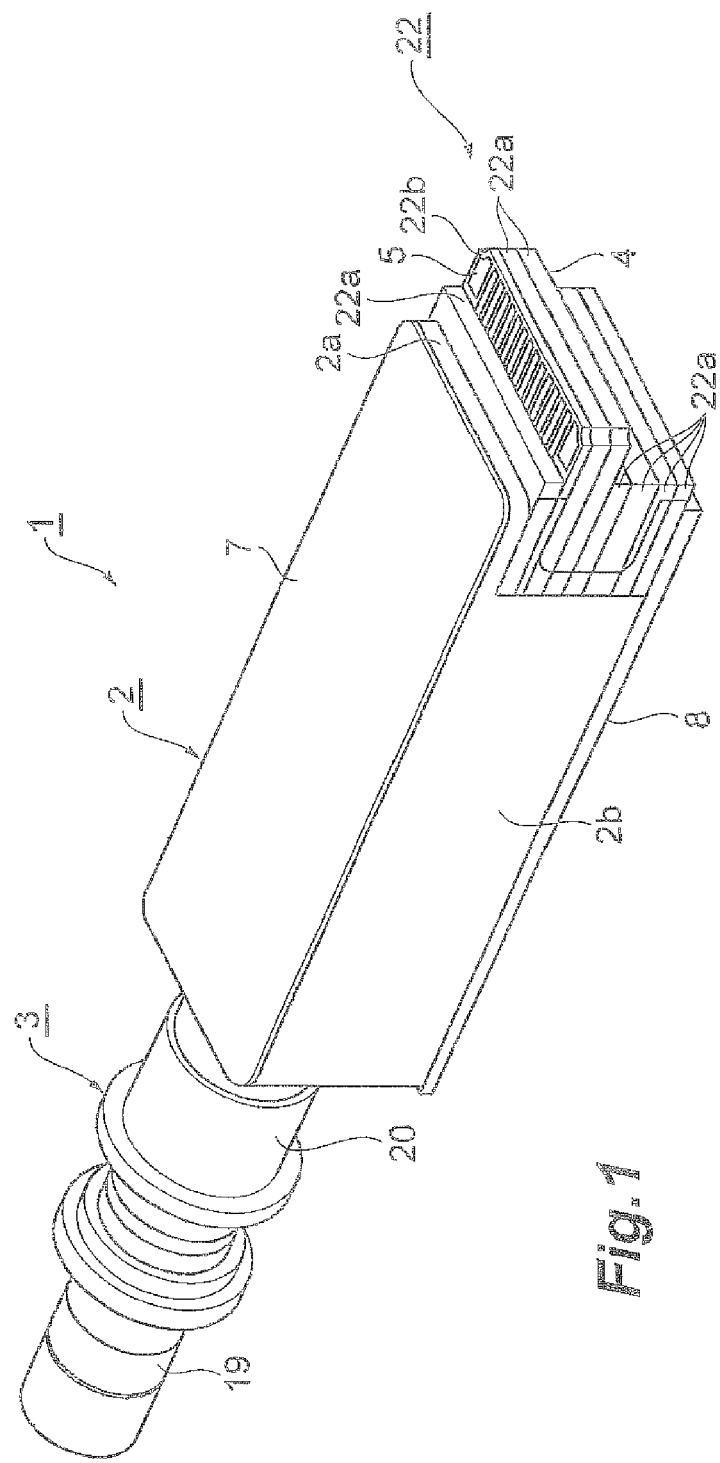
FIG. 1 shows an outer appearance of a transmitter module according to an embodiment of the present application, where the transmitter module is viewed from a rear top.

A transmitter module such as that shown in FIG. 1 is necessary to match characteristic impedance of the transmission lines to enhance and secure high frequency performance. Such a transmission line is known as a micro-strip line and/or a co-planar line whose width of the conductive line and thickness of a substrate on which the conductive line is formed are designed to set the characteristic impedance in 50Ω for the single line, or 100Ω for the differential arrangement.

However, the transmission lines prepared outside of the housing 2 of the transmitter module 1 are connected to the transmission lines in the housing 2 through electrical pads and bonding wires wire-bonded to the electrical pads; which forces hard to match the characteristic impedance of the transmission line in 50Ω because the bonding wires have inherently show an inductive characteristic depending on a length and a diameter thereof. For instance, a gold (Au) wire with a diameter of 50 µm and a length of 1 mm inherently shows inductance of about 1 nH. Accordingly, the transmitter module 1 is necessary to be designed in an arrangement of electrical components such that the length of bonding wires becomes as short as possible not to cause impedance mismatching.

On the other hand, a transmitter module operable for the single optical signal generates an enough room in peripheries of the transmission lines even when the they are formed in a center of the module, which enhances the flexibility of the assembly or reduces the restriction in the arrangement of components. However, the transmitter module 1 like that of the present application, which is necessary to operate for a plural signals, needs to provide several transmission lines and several input/output terminals for electrical signals to be transmitted. The arrangement of the electrical and optical components are necessary so as to make the bonding wires shortest.

Figure 2:
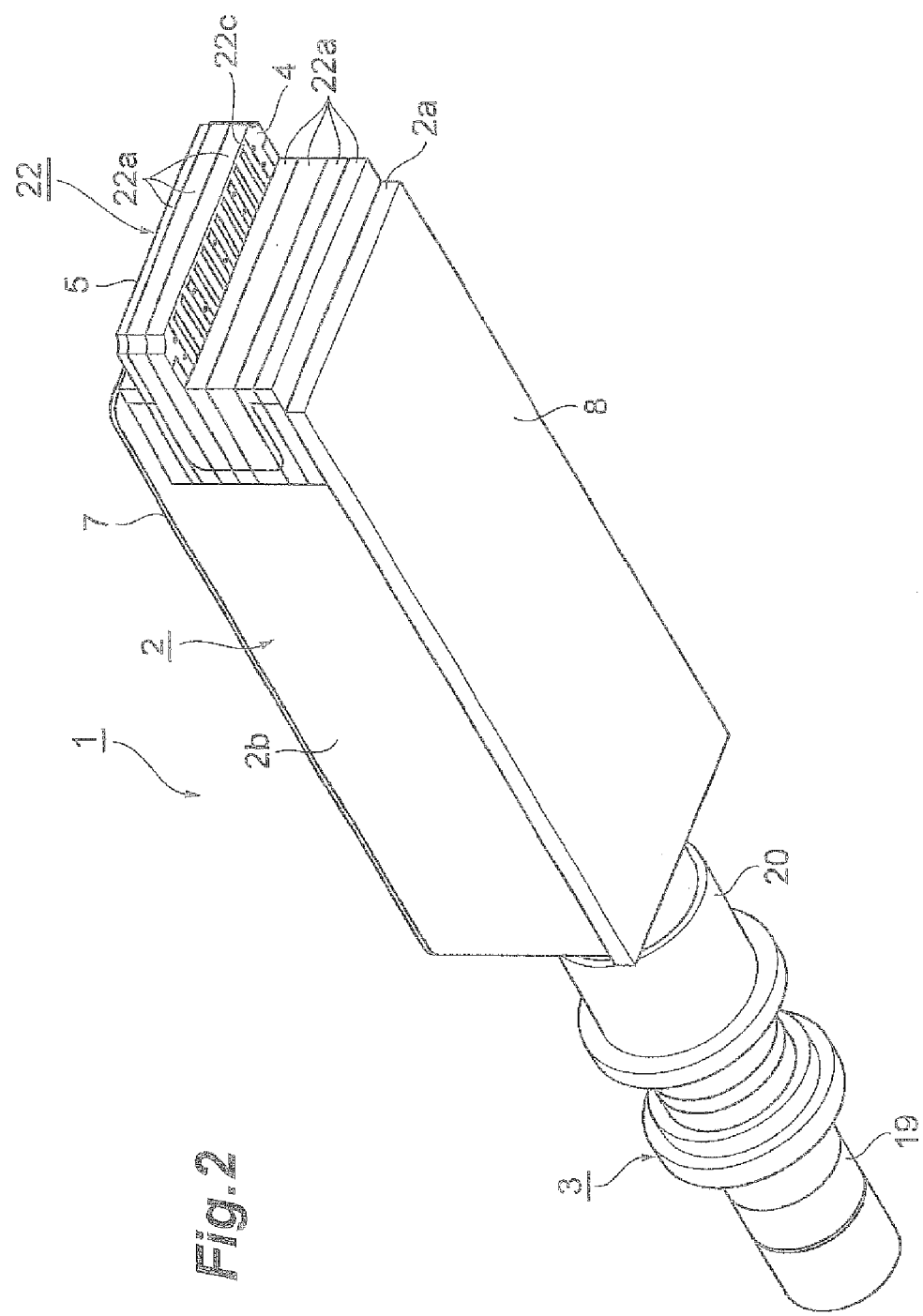
FIG. 2 shows an outer appearance of the transmitter module shown in FIG. 1, where FIG. 2 views the transmitter module from the rear bottom.
Figure 3:
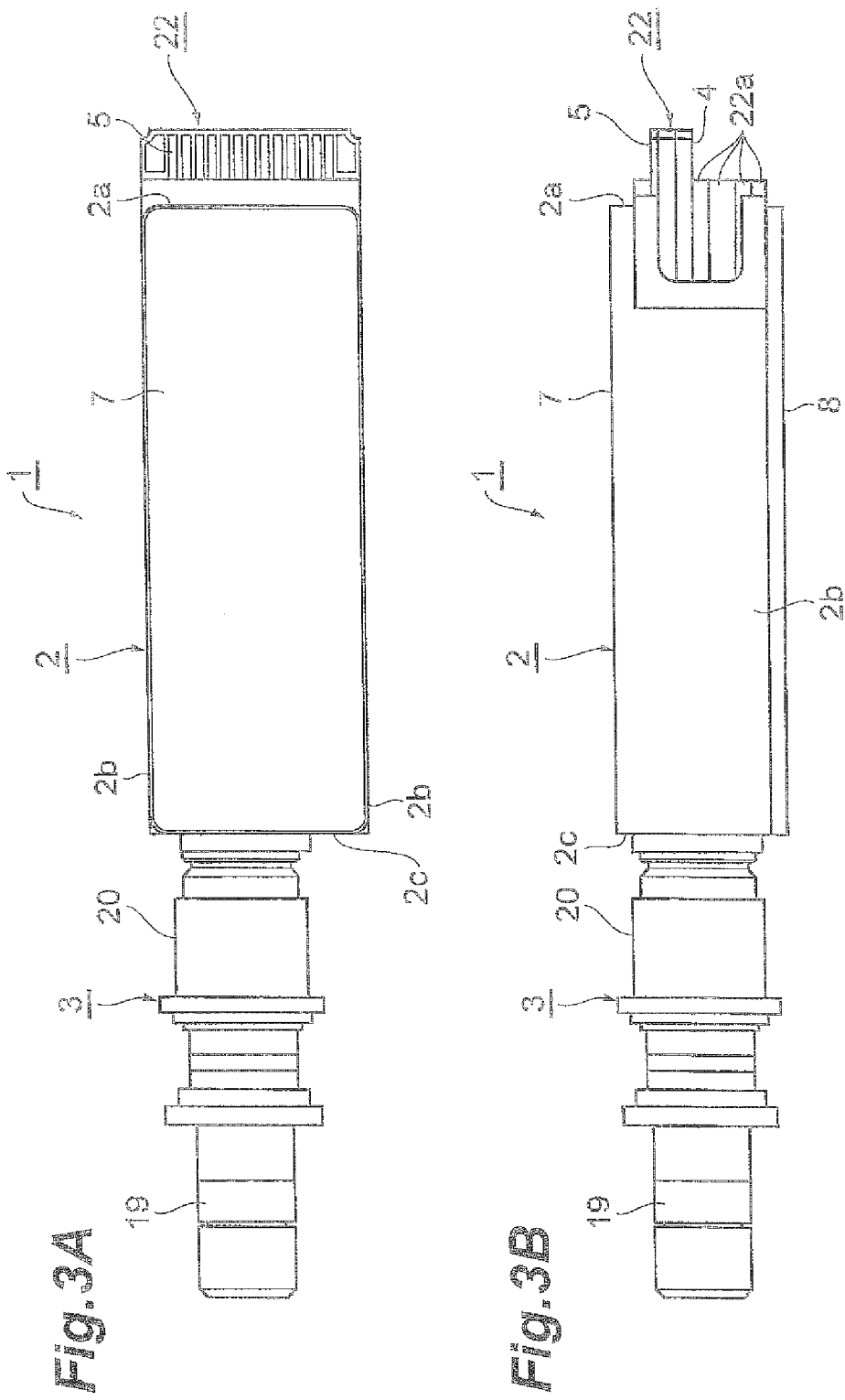
FIG. 3A is a plan view and FIG. 3B is a side view of the transmitter module shown in FIGS. 1 and 2.

FIG. 1 shows an outer appearance of a transmitter module 1 of the present application, which is viewed from a rear top, while, FIG. 2 is viewed from the rear bottom. FIGS. 3A and 3B are a plan view and a side view of the transmitter module 1, respectively. The present specification assumes that "rear" is a side where an electrical plug 22 is provided and "front" is a side opposite to the rear and provides a sleeve assembly 3. The transmitter module 1 primarily comprises the box-shaped housing 2 and a cylindrical sleeve assembly 3 provided in the front wall 2c of the housing 2. The housing 2 also provides the electrical terminal 22 in the rear wall 2a. The electrical terminal 22 includes RF terminals 4 for high frequency signals and DC terminals 5 for DC biases. The RF terminals 4 are collectively arranged in one side of the electrical terminal 22, and the DC terminal 5 are also collectively arranged in another side of the electrical terminal 22.

The present transmitter module 1 provides one electrical terminal only in the rear wall 2a of the housing 2 because, when the transmitter module 1 going to be installed within an optical transceiver type of, for instance, CFP2 and/or CFP4, no spaces or no rooms are left in respective sides 2b of the housing 2. A receiver module and the transmitter module are arranged in side-by-side within the housing 2.

Figure 4:
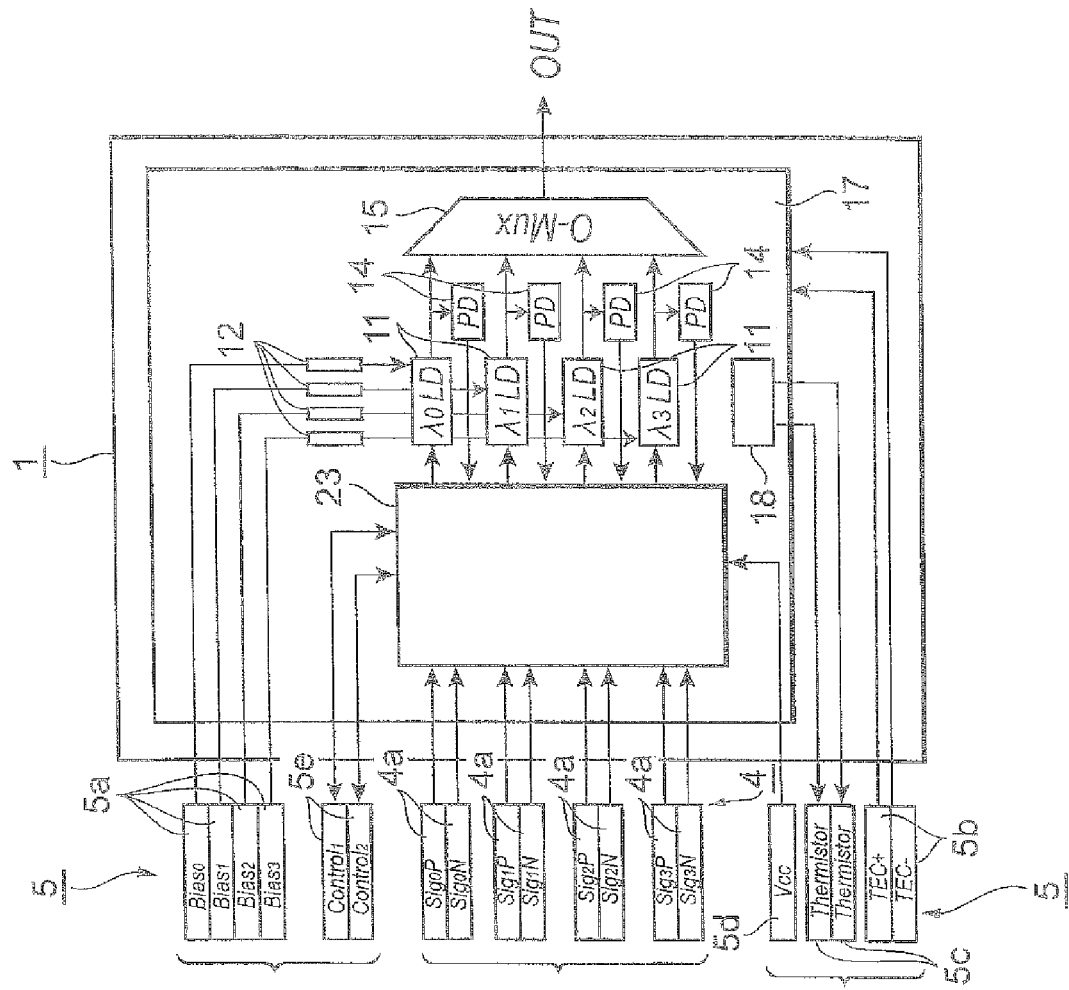
FIG. 4 shows a functional block diagram of the transmitter module.
Figure 5:
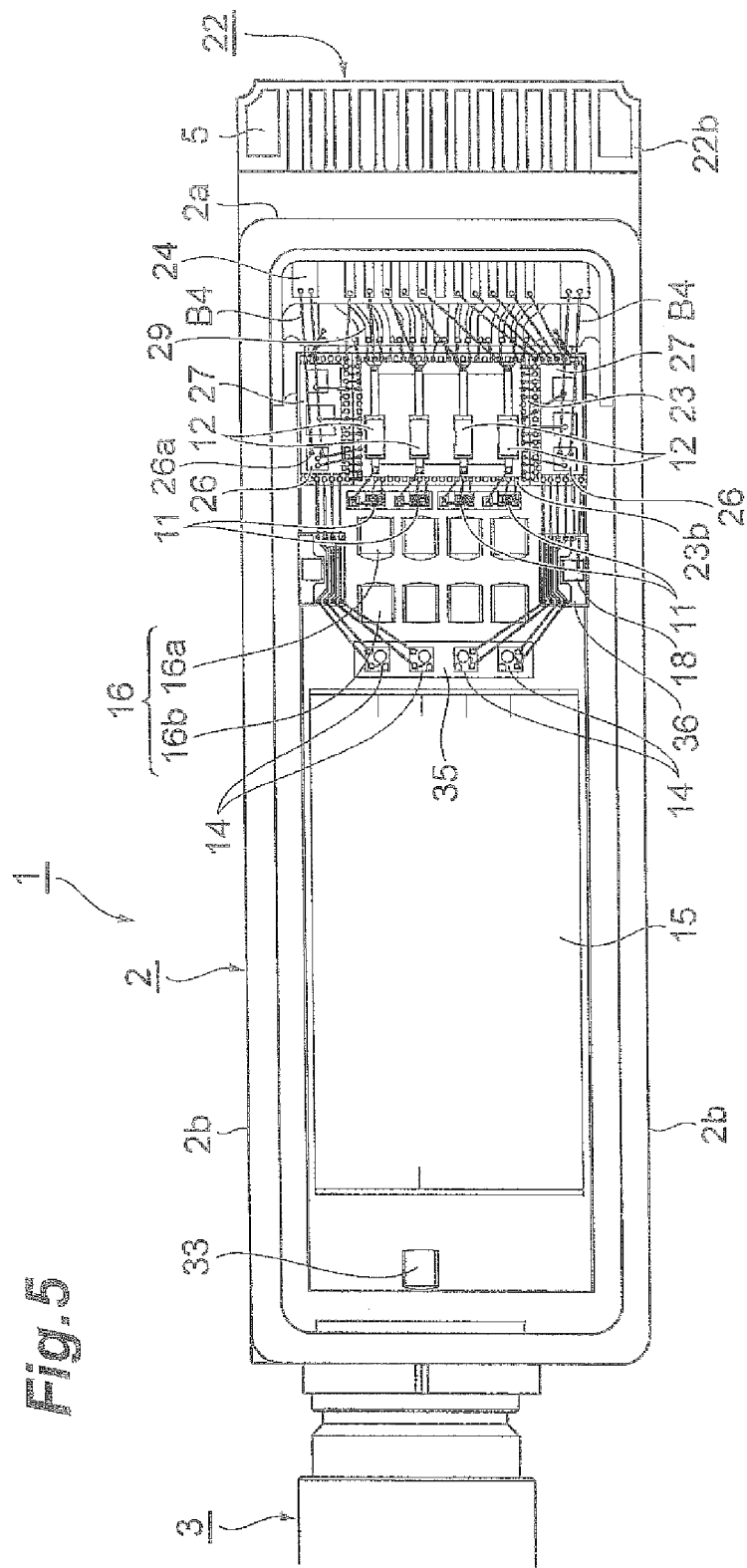
FIG. 5 shows an inside of the transmitter module.

The transmitter module 1 installs, as shown in FIGS. 4 and 5, a plurality of laser diodes (LDs) 11, a driver 23 to drive the LDs, some passive components such as inductors 12 and capacitors, a plurality of photodiodes (PDs) 14 whose number matches with the number of LDs 11, a plurality of optical components such as an optical multiplexer 15 to multiplex beams each emitted from the LDs 11 and lenses 16, a thermoelectric cooler (TEC) 17, and a thermistor 18.

The housing 2 is air-tightly or hermetically sealed by welding the ceiling 7 as substituting inner atmosphere, namely air, with dry nitrogen after those optical and electrical components are installed therein. The light multiplexed with respective optical beams output form LDs 11 optically couples with a coupling fiber secured in the sleeve assembly 3 passing through the optical components, specifically, lenses, an optical isolator, and a window provided in the front wall 2c.

The sleeve assembly 3 includes a cover 19 and a jointer 20. The cover 19 covers a sleeve that receives a ferrule secured in an end of an external fiber. The sleeve and the jointer 20 are welded by the YAG laser to the housing 2 after aligning the multiplexed light with the sleeve, or exactly, the external fiber set within the sleeve. The housing 2 provides a bottom 8 made of material with good thermal conductivity, typically, copper tungsten (CuW), and a plurality of ceramic layers forming the electrical terminal 22. The TEC 17 is directly mounted on the bottom 8.

As shown in the figures, the electrical terminal 22 includes a plurality of ceramic layers 22a each having interconnections and via holes connecting interconnections in respective ceramic layers 22. The transmission lines in the housing 2 are connected to the interconnections in the ceramic layers 22a, and the interconnections externally appears as the RF terminals 4 and the DC terminal 5. Explaining further specifically, the ceramic layers 22a provides the DC terminal 5 on the topmost surface 22b thereof, but the RF terminals 4 on the bottommost surface 22c.

The bottom 8, as described, is made of material with good thermal conductivity, typically CuW, to dissipate heat generated in the inside of the housing 2. The bottom 8 in the outer surface thereof comes in contact with a chassis of the optical transceiver that installs the transmitter module 1 as interposing a flexible member such as thermal sheet to enhance the heat dissipation from the bottom 2 to the chassis.

FIG. 4 is a functional block diagram of the transmitter module 1. The transmitter module 1 includes four (4) LDs 11, where each emits an optical beam with a wavelength specific thereto and different from others, and the optical multiplexer 15 to multiplexes respective optical beams. The explanation below assumes the transmitter module 1 includes four LDs 11, or is operable as an optical source with four signal channels; but the transmitter module 1 is not restricted to this arrangement, and the transmitter module 1 may install two or more LDs or channels.

The transmitter module 1 further installs a TEC 17 for mounting primary components of the transmitter module 1. That is, the TEC 17 mounts a driver 23, four LDs 11, four monitor PDs 14, the optical multiplexer 15, and the thermistor 18 thereon. The LDs 11, the inductors 12, the monitor PDs 14 and the lenses 16 are disposed in respective rows of four elements along the lateral direction of the housing 2. The thermistor 18 is disposed aside of the outer most lens 16; but, the transmitter module 1 may arrange two thermistors in respective outer sides of the outer most lenses 16.

The RF terminals 4 include four pairs of pads corresponding to respective LDs 11, where each pair has the differential arrangement. The DC terminals 5 include four bias terminals 5a to provide bias currents to respective LDs 11, two power supply terminals 5b for providing power to the TEC 17, two signal terminals 5c for the thermistor 18, one power terminal 5d for supplying the power to the driver 23, two control terminals 5e for communicating with the driver 23, and some ground terminals. Thus, the transmitter module 1 operable for a plurality of channels considerably increases the number of terminals, not only RF terminals 4 but DC terminals 5. In the transmitter module 1 of the embodiment, the outputs of the monitor PDs 14 are converted into a digital form and output through the control terminals 5e. A conventional transmitter module with the multiple channel arrangement extracts monitor signals through respective independent terminals, which requires additional number of terminals. The present arrangement is unnecessary to prepare independent terminals to extract the monitor signals.

Figure 6:
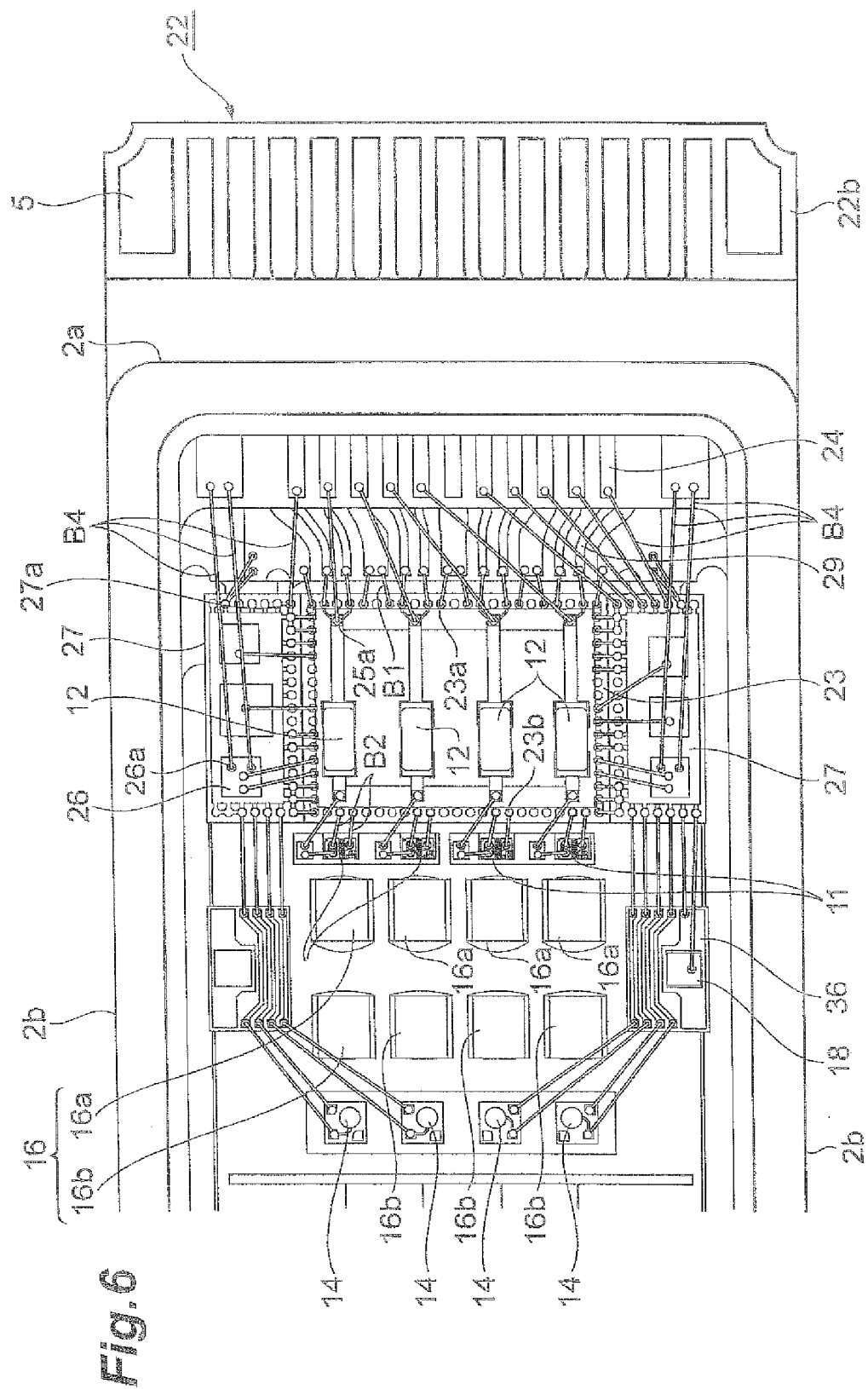
FIG. 6 magnifies a portion where electronic components are installed.
Figure 7:
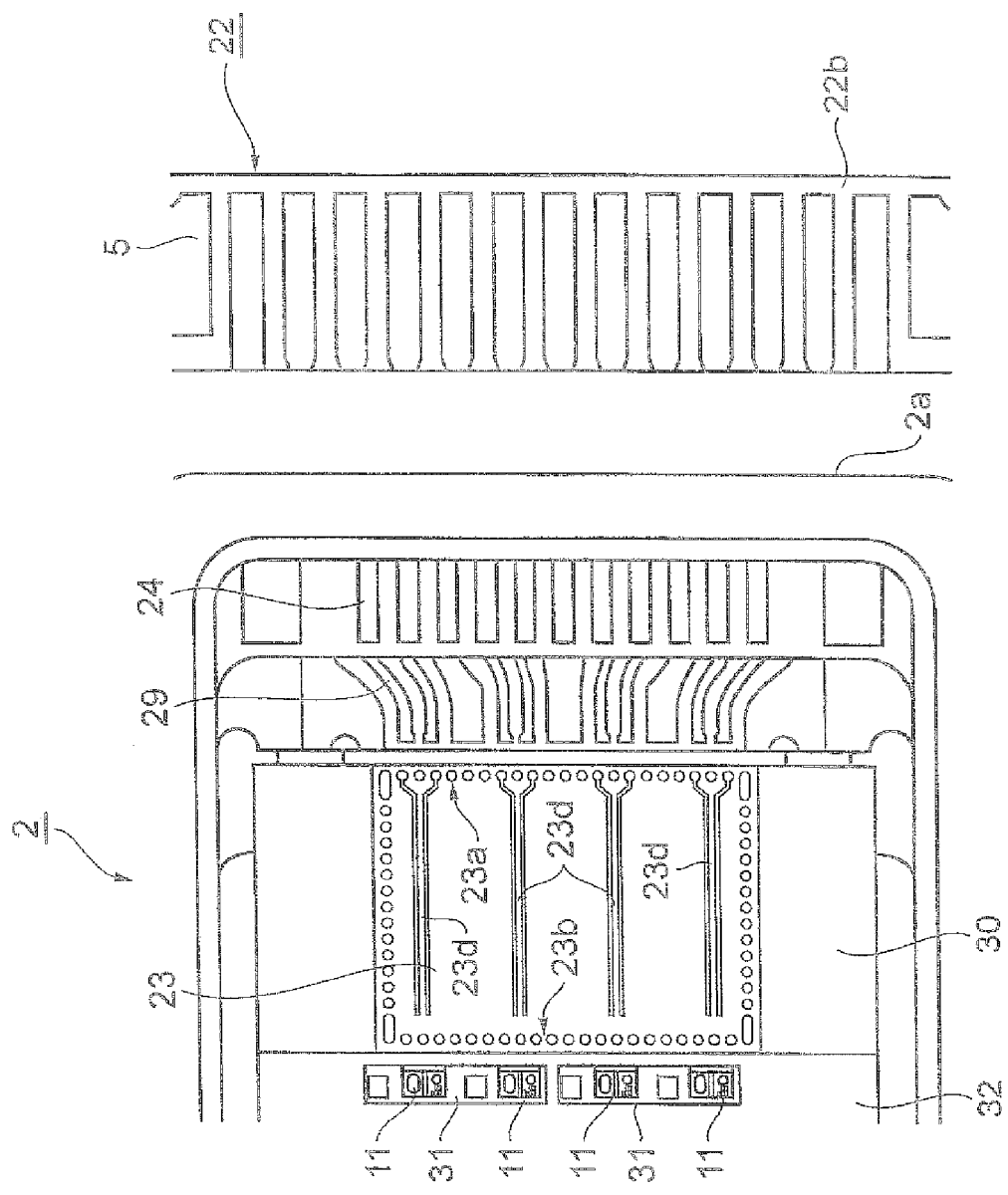
FIG. 7 shows the portion where only the driver is installed.
Figure 8:
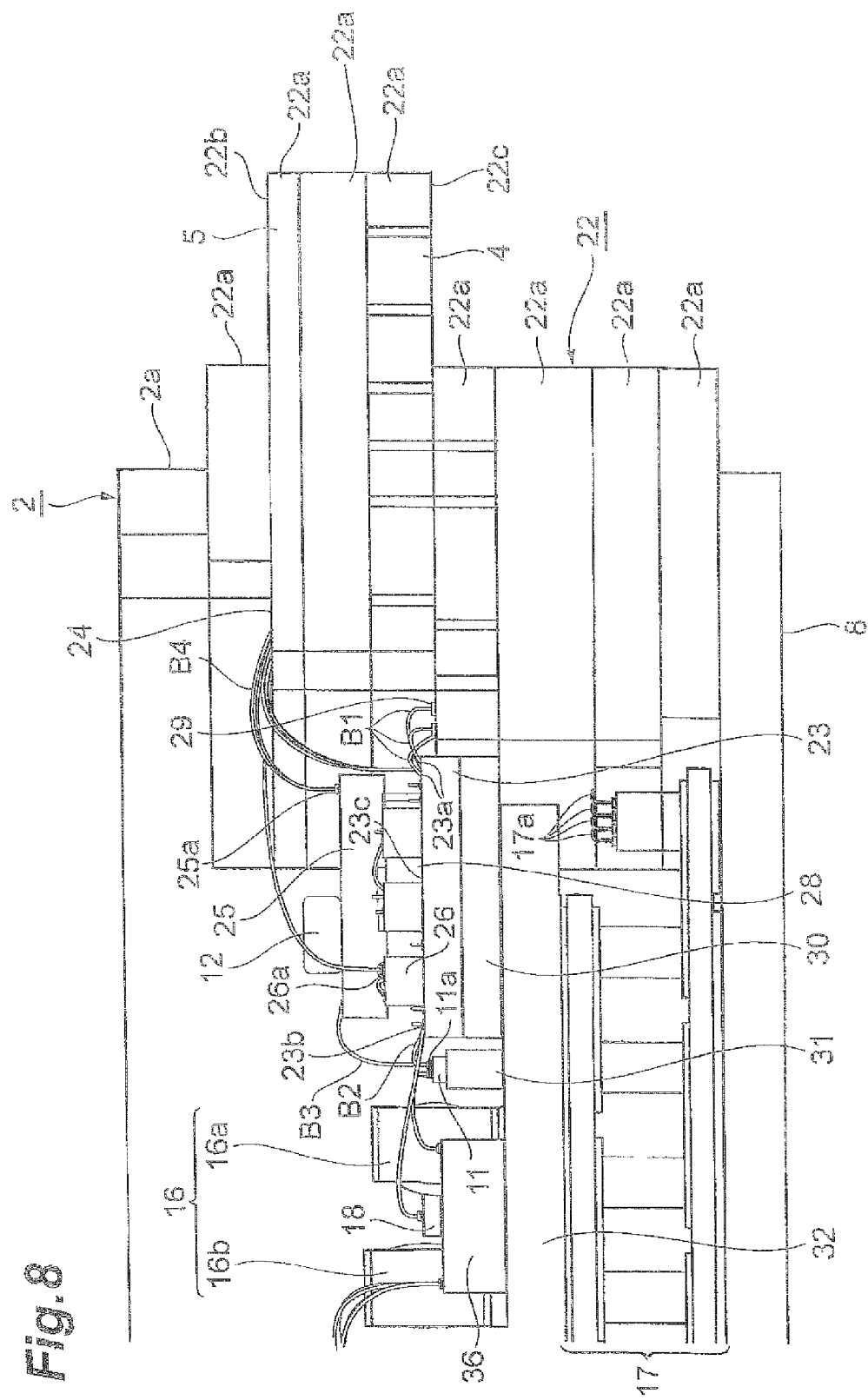
FIG. 8 is a side cross section of the portion.

FIG. 5 shows an inside of the transmitter module 1, FIG. 6 magnifies a portion where the driver 23 is installed, FIG. 7 shows the portion but members placed on the driver 23 is not installed, and FIG. 8 is a side cross section of the portion. The RF terminals 4, as already described, is provided in the side 22c of the electrical terminal 22 opposite to the side 22b where the DC terminals 5 is provided. The ceramic layers 22a in a portion where the RF and DC terminal, 4 and 5, are provided protrudes from rest portions. The sides, 22b and 22c, are provided in this protruding portion.

The interconnections connected to the DC terminals 5 enter the inside of the housing 2 as extending on the top surface 22b of the ceramic layer 22a and become an inner DC terminals 24. The DC terminals 24 are provided on the top of the seventh ceramic layer 22a counted from the bottom 8 of the housing 2. The interconnection 17a for the TEC 17 is pulled down from the DC terminals 24 to the top of the second ceramic layer 22a also counted from the bottom 8 of the housing 2 through the via holes. Rest of the DC terminals 24 are connected to the pads 25a on the top carrier 25, which will be described later, to the pads 26a of the capacitors 26, and the pads 27a on the wiring substrate 27 mounting the capacitors 26.

Figure 9:
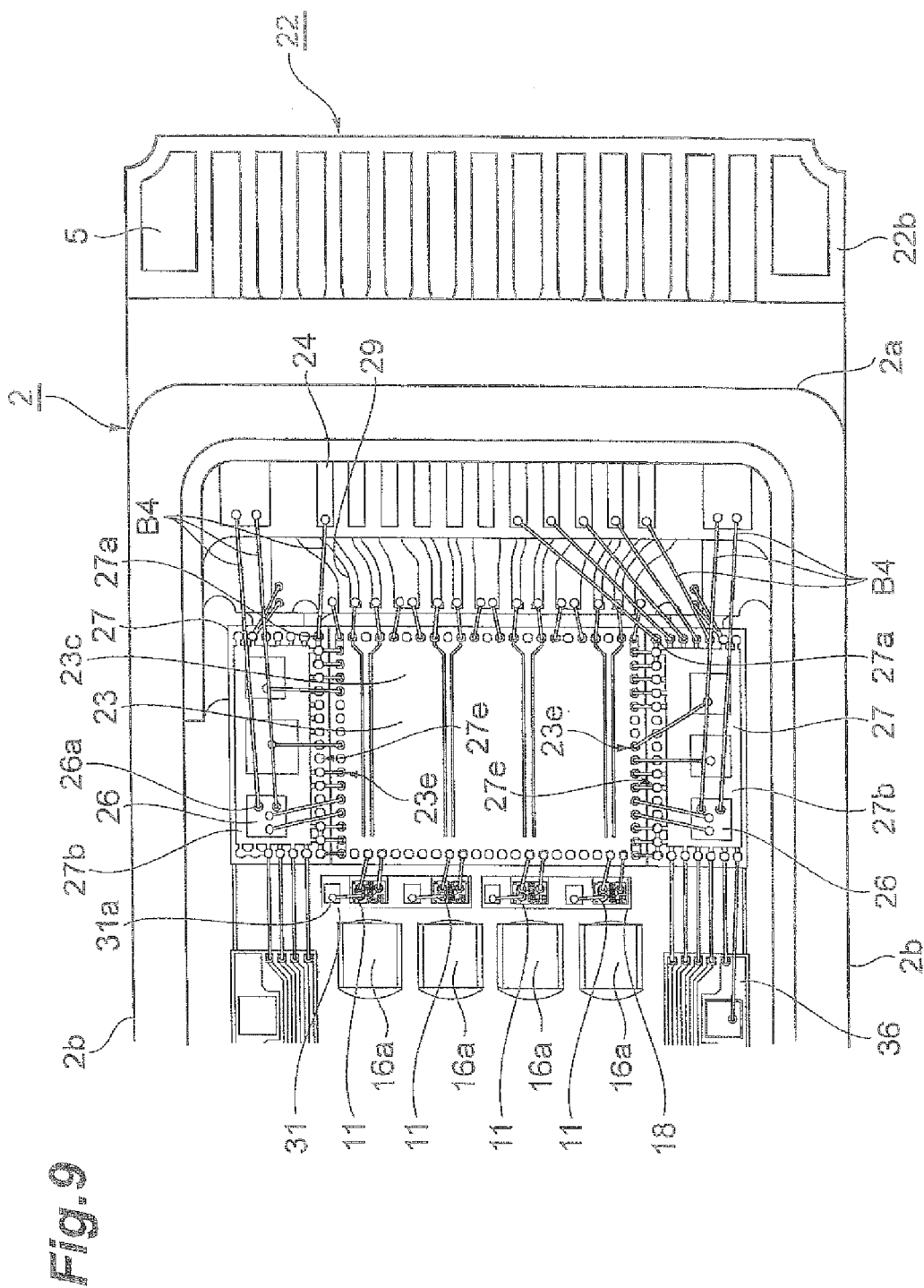
FIG. 9 shows the portion where the process to assembly the transmitter module forwards the step to install the electronic components beside the driver.

Referring to FIGS. 8 and 9, the horizontal level of the top of seventh ceramic layer 22a on which the DC terminals 24 are formed is higher than the horizontal level of the pads 25a on the top carrier 25, the pads 26a of the capacitors 26, and the pads 27a on the wiring substrate 27, which enables that the bonding wire B4 extracted from the DC terminals 24 makes not only an acute angle with respect to the DC terminals 24 but also a substantial right angle against the pads, 25a to 27a.

The interconnections, which extend from the bottom surface 22c of the ceramic layer 22a, appear on the top surface the of the fourth ceramic layer 22a also counted from the bottom 8 of the housing 2 and connected to the inner RF terminals 29 without passing any via holes. These interconnections are for high frequency signals. Arrangements of these interconnections for high frequency signals, namely, extend in the same top surface, avoid the impedance mismatching. The inner RF terminals 29 are wire-bonded to the pads 23a provided on the top surface of the driver 23.

The horizontal level of the inner RF terminals 29 is substantially same with or slightly lower than the horizontal level of the pads 23a on the top of the driver 23 to enable the ball-bonding to the pads 23a. Specifically, the bonding wire B1 is first ball-bonded to the pads 23a of the driver 23, then moving the bonding head above the inner RF terminals 29 as extending the bonding wire B1, then ball-bonded to the inner RF terminals 29. When the horizontal level of the second bonding position is slightly lower than the horizontal level of the first bonding position, the movement from the first position to the second position as extending the bonding wire becomes facilitated.

The bonding wire B1 bonded to the pads 23a, the first bonding positions, makes an angle slightly smaller than a right angle against the pads 23a, and another angle slightly greater than the former angle but smaller than a right angle against the inner RF terminals 29, the second bonding position. This shape of the bonding wire B1, which may be realized by setting the horizontal level of the second bonding position, namely, the inner RF terminals 29, slightly lower than the first bonding position, namely, the pads 23a on the driver 23, not only makes the process simple but enhances the reliability of the ball-bonding process.

The other pads 23b on the driver 23, which are provided in a side opposite to the side where the former pads 23a are formed, are wire-bonded to the pads 11a of respective LDs 11. Also, the horizontal level of the pads 11a is slightly lower than the level of the other pads 23b. Accordingly, this arrangement of two pads, 23b and 11a, makes the bonding wire B2 connecting the former pads 23b to the latter pads 11a short as securing the wire-pulling strength.

As shown in FIGS. 6 to 8, the TEC 17 mounts the carrier 32 thereon, and the carrier 32 mounts the IC sub-mount 30, the LD sub-mount 31 and the thermistor sub-mount 36. The IC sub-mount 30 mounts the driver 23 and the wiring substrate 27. The LD sub-mount 31 mounts the LDs 11 thereon. The driver 23 mounts the top carrier 25 by interposing a spacer 28. The top carrier 25 mounts the inductors 12 thereon. That is, five layers of the carrier 32, the IC sub-mount 30, the driver 23, the spacer 28 and the top carrier 25, exist under the inductors 12 to the top of the TEC 17.

Referring to FIG. 7, the LD sub-mount 31, exactly two LD sub-mounts 31 are arranged on the carrier 32 in side-by-side along the lateral direction of the housing 2. Each of the LD sub-mounts 31 mounts two LDs 11 also arranged in side-by-side. Referring to FIG. 6, the wiring substrate 27, exactly, two wiring substrates 27 are disposed on the IC sub-mount 30 in respective outer side of the driver 23. The thermistor-substrate 36, exactly, two thermistor substrates 36 are arranged on the carrier 32 in the front of respective wiring substrates 27 as putting the LDs 11 and lenses 16a therebetween. In the present transmitter module 1, only one of the thermistor sub-mounts 36 provides the thermistor 18 thereon.

In an example, the spacer 28 is made of aluminum nitride (AlN) with a thickness of 350 µm, the top carrier 25 is made of silica (SiO$_2$) with a thickness of 350 µm, the IC sub-mount 30 is also made of AlN with a thickness of 300 µm, the LD sub-mount 31 is made of AlN with a thickness of 400 µm, and the carrier 32 is made of AlN with a thickness of 300 µm. The spacer 28, which is mounted on the driver 23, preferably has a thermal expansion co-efficient substantially same with that of a primary material of the driver 23 so as not to degrade performance of the driver 23. The top carrier 25 is preferably made of material having relatively smaller dielectric constant because the pads and/or the interconnections formed thereon cause parasitic capacitors. Such capacitors with substantial capacitance degrade the high frequency performance of the transmitter module 1. Accordingly, the top carrier 25 is preferably made of material having smaller dielectric constant, typically silicon die-oxide (SiO$_2$). On the other hand, the IC sub-mount 30 and the LD sub-mount 31 are preferably made of material having good thermal conductivity to dissipate heat generated by the LDs 11 and the driver 23 effectively. The carrier 32 is also preferably made of material having good thermal conductivity to dissipate heat generated by the driver 23 and the LDs 11, and to make the temperature distribution on the TEC 17 uniform.

The optical beams each emitted from the LDs 11 enter the optical multiplexer 15 as passing through respective lenses 16. The PDs 14 are put in the upstream of the multiplexer 15 to monitor the magnitude of respective optical beams output from the LDs 11. The multiplexer 15 multiplexes the optical beams to output the multiplexed light. The multiplexed light is concentrated on the coupling fiber secured in the sleeve assembly 3 as passing through one or more lenses 33 also provided in the sleeve assembly 3. Mating an external optical connector with the sleeve assembly 3, the transmitter module 1 may optically couple with the external fiber. The transmitter module 1 may also install an optical isolator on optical paths in the housing 2 or the sleeve assembly 3.

The transmitter module 1 receives the RF signals for respective LDs as the differential configuration. Accordingly, the RF terminals 29 within the housing 2 have a grouped arrangement of G/Sig+/Sig−/G, where G, Sig+, and Sig− mean the ground, the signal with a positive phase, and the signal with a negative phase. On the other hand, the pads 23a on the driver 23 have an additional ground pad between pads for the positive and negative signals, Sig+ and Sig−, respectively. The additional ground pad is not wire-bonded to anywhere but connected to the inner ground of the driver 23. The RF terminals 29 may have an additional ground terminal between two terminals for the positive and negative signals. In such an arrangement, the additional ground terminal may be wire-bonded to the additional ground pad on the driver 23.

The pads for the positive and negative phase signals, Sig+ and Sig, respectively, are extended by the interconnections 23d toward the side where the pads 23b for the LDs 11 are formed, and connected to respective driving circuits integrated within the driver 23 to practically drive the LDs 11. The driver 23 may have other circuits to control the transmitter module 1 beneath the interconnections 23d. The driving circuits are formed only in the side facing the LDs 11 where the pads 23b are formed. The RF signals amplified by the driving circuits are provided from the pads 23b through the bonding wires B2.

The LDs 11 have the type of, what is called as the edge emitting type each having an n-type substrate and some epitaxial layers grown on the n-type substrate. An LD with the n-type substrate is often assembled as the epitaxial layer is downward and the substrate is upward, which forms the epitaxial layer becomes the cathode while the substrate is the anode. The LDs 11 of the present embodiment, however, have the arrangement where both the anode and the cathode are extracted from the top surface, namely, the side of the epitaxial layers, by pulling up the electrode in the substrate to the top surface by the via hole. This is because the LDs 11 of the present embodiment are driven by, what is called, the shunt-driving mode. In the shunt-driving mode, the anode, namely, the epitaxial layer for the n-type substrate, receives the driving signal; while, the cathode, namely, the n-type substrate, is grounded. As shown in FIGS. 6 and 8, the bonding wires B2 extracted from the pads of the driver 23b are both bonded to the pads 11a formed on the top surface of the LDs 11.

Figure 10:
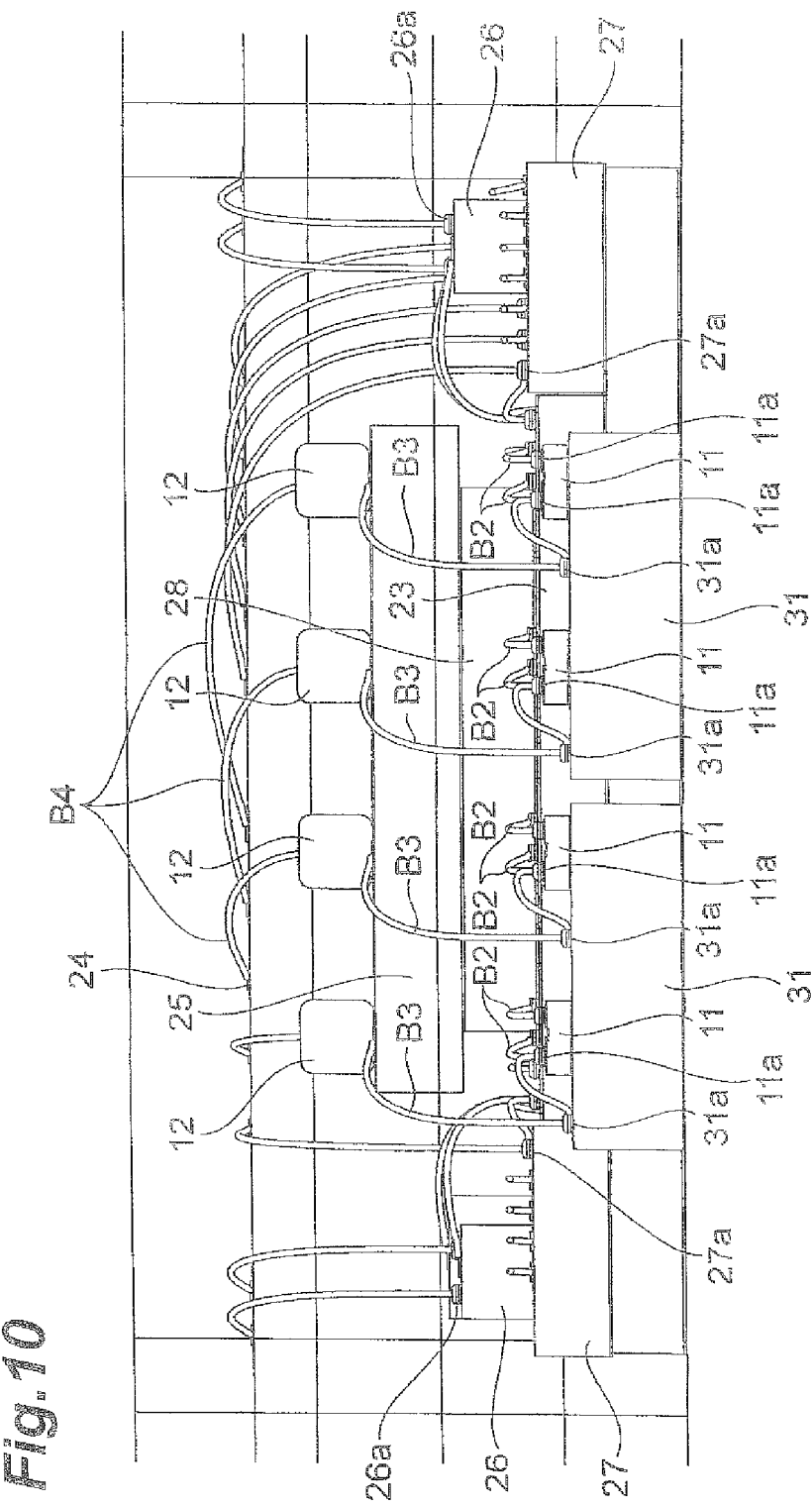
FIG. 10 shows the wirings of the bonding wires connecting the components in the housing.
Figure 11:
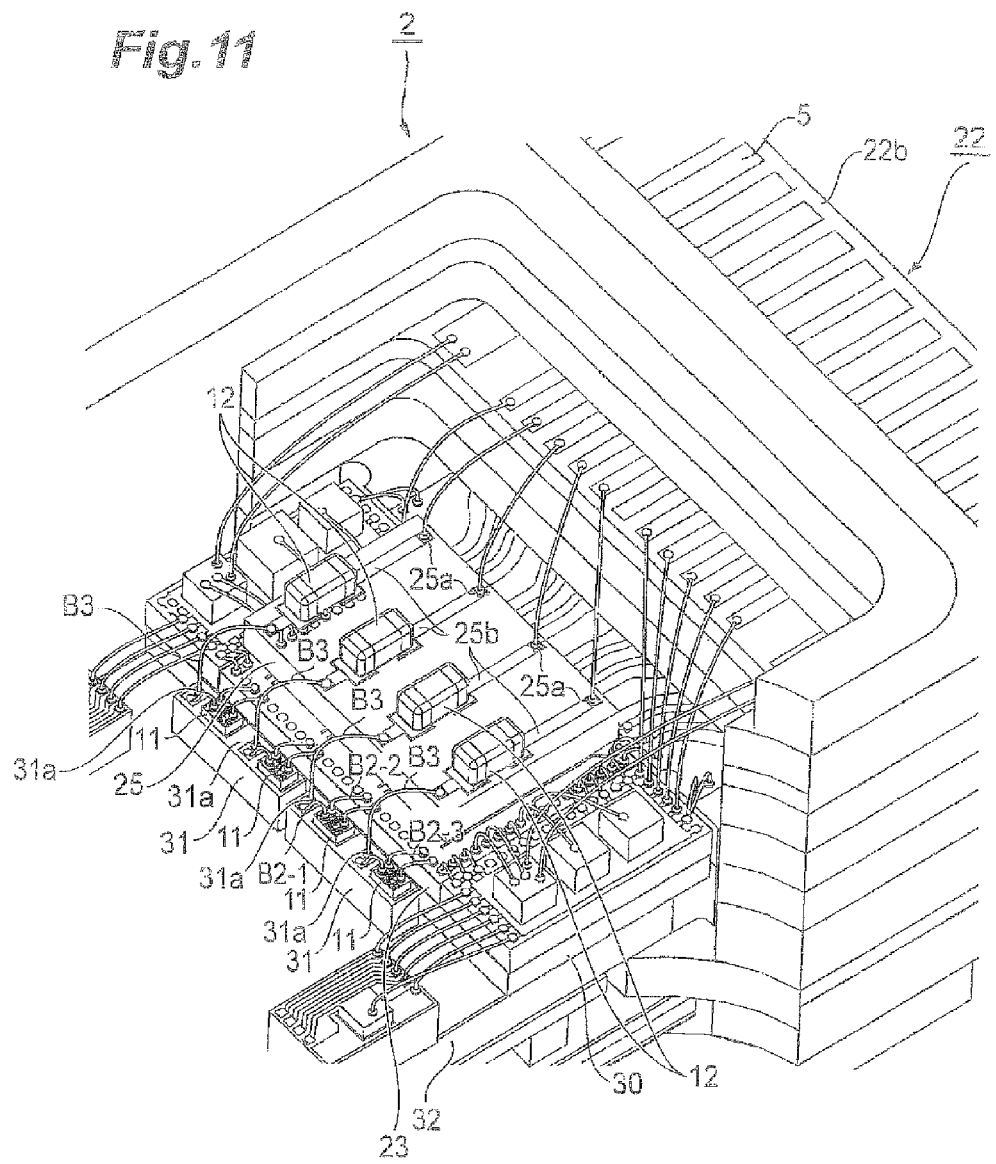
FIG. 11 is a perspective view of the portion where the electronic components are installed and wire-bonded by respective bonding wires.

Also, as shown in FIGS. 10 and 11, the relay pads 31a provided in one side of the LD sub-mount 31 are connected to the inductors 12 mounted on the top carrier 25. Specifically, the top carrier 25 provides four interconnections 25b corresponding to respective LDs 11, where the interconnections 25b are cut by respective inductors 12. The bias currents are provided to respective LDs 11 through the inductors 12 and the relay pads 31a on the LD sub-mount 31.

The shunt-driving circuits, which practically drive the LDs 11 and integrated in the driver 23, each includes a switching transistor to shunt the bias current provided through the inductor 12. When the switching transistor turns on, almost whole bias current passing through the inductor 12 flows in the switching transistor. On the other hand, when the switching transistor turns off, the whole bias current flows in the LD. Thus, the LD is modulated. The inductors 12 mounted on the top carrier 25 are inductors to electrically isolate the parallel circuit of the switching transistor and the LD from the external power supply. The inductance of the inductors 12 is preferably large enough to stably isolate the parallel circuits from the external power supply, which inevitably increases the outer dimensions of the inductors 12. The transmitter module 1 of the present embodiment installs the inductors 12 with relatively larger outer dimensions in a space above the driver 23 as interposing the spacer 28.

The shunt-driving circuit has a feature to inherently generate less heat compared with other type of the driving circuit. Accordingly, it is unnecessary or less important to consider the heat dissipation of the driver 23 toward the above space thereof. Moreover, the present transmitter module 1 installs the TEC 17 with the carrier 32 that mounts the driver 23 through the IC sub-mount 30. Accordingly, the driver 23 is set under a suitable temperature condition.

The inductors 12 on the top carrier 25, as shown in FIG. 11, are connected to the relay pads 31a on the LD sub-mount 31 with relatively longer bonding wires B3. However, these bonding-wires B3 do not cause the degradation of the high frequency performance of the transmitter module 1 because the bonding wires B3 are to connect the inductors 12 to the LDs 11. That is, the bonding wires B3 are provided in places where substantial inductance is requested. Accordingly, the bonding wires B3 preferably have a smaller diameter so as not to increases parasitic resistance.

Passive components such as capacitors 26 for bypassing the power supply are disposed around the driver 23. Referring to FIG. 12, the interconnections L1 for the monitor PDs 14, those L2 for the thermistor 18, and/or those for controlling the driver 23 are electrically connected to the DC terminals 24 as extending through the thermistor sub-mount 36 and the wiring substrate 27 placed in respective sides of the lenses 16, the LDs 11, and the driver 23. The wiring substrate 27 also mounts the bypassing capacitors 26; accordingly, the interconnections for the monitor PDs 14 and the thermistor 18 extend inner layers of the wiring substrates 27.

As shown in FIG. 12, the top surface 22d of one of the ceramic layers 22a where the inner RF terminals 29 are provided is different from, or exactly, faces the bottom surface 22c of another of the ceramic layers 22a where the outer RF terminals 4 are provided. The inner RF terminals 29 and the interconnections extending therefrom preferably have the transmission impedance of, for instance, 50Ω for the mono-phase line or 100Ω for the differential phase line by the arrangement of the micro-strip line and/or the co-planar line. However, a via-hole sometimes degrades the transmission impedance. The arrangement described above is unnecessary to connect two RF terminals through via-holes; accordingly, the transmission impedance may be secured.

Referring to FIG. 9, the driver 23 of the embodiment provides the pads 23e for DC signals in respective sides facing the side walls 2b of the housing 2, and the longitudinal sides of the driver 23 only provide the pads, 23a and 23b, for the RF signals. Direct wiring of the DC pads 23e of the driver 23 with the DC terminals 24 in the rear wall may cause unintentional contact of bonding-wires. Accordingly, the embodiment provides the wiring substrates 27 between the sides of the driver 23 and the side walls 2b. The wiring substrates 27 provides the pads 27c facing the pads 23e on the driver 23. That is, the pads 23e on the driver 23 are drawn to the DC terminals 24 in the rear wall through the pads 27c on the wiring substrate 27, the interconnections within the wiring substrate 27, and the pads 27a on the wiring substrate 27. Bonding wires connect the pads 23e to the pads 27c, and the pad 27a to the DC terminals 24.

As shown in FIG. 9, the wiring substrate 27 provides the pads, 27a and 27c, along the edges facing the DC terminals 24 and the pads 23e on the driver 23, respectively. Provided in an area surrounded by the pads, 27a and 27c, on the top surface of the wiring substrate 27 is a ground pad 27b on which bypassing capacitors 26 are mounted. The interconnections between the pads, 27c and 27a, are provided underneath the ground pad 27b. Because the wiring for the DC terminals 24 is bypassed through the wiring substrate 27, the space above the driver 23 is unnecessary to extend bonding wires, which enables that the top carrier 25 mounts the inductors 12 thereon.

Also, the transmitter module 1 of the embodiment, as shown in FIG. 5, provides beam splitters (BSs) 35 in the downstream of the second lenses 16b, namely, the collimating lenses. The BSs 35 mounts respective PDs 14 thereon. That is, the PDs 14 may detect respective portions of the optical beams each emitted from the LDs 11 and generate monitoring signals. The monitoring signals are provided to the driver 23 through the thermistor sub-mounts 36 disposed in respective sides of the lenses, 16a and 16b. The driver 23 integrates with auto-power control circuits (APCs) for respective LDs 11 independently to maintain the output power of the LDs in constant based on thus provided respective monitoring signals from the PDs 14.

The present transmitter module 1 provides two lenses in respective downstream of the LDs 11. The first lenses 16a and the second lenses 16b may be optional. When the optical multiplexer 15 is a type of the arrayed waveguide (AWG), the second lenses 16b may be concentrating lenses to concentrate respective optical beams onto the waveguides of the AWG. In such a case, two-lens system of the first lens 16a and the second lens 16b may be the collimated beam system when the first lens is a type of the collimating lens, or the focused beam system when the first lens is a type of the concentrating lens. On the other hand, when the multiplexer 15 is a type of the wavelength Division Multiplexing (WDM) filter, the second lenses 16b may be collimating lenses to enhance the optical coupling efficiency for the lens 33 provided in front of the output port of the housing 2 with respect to the coupling fiber secured in the sleeve assembly 3.

Figure 13A:
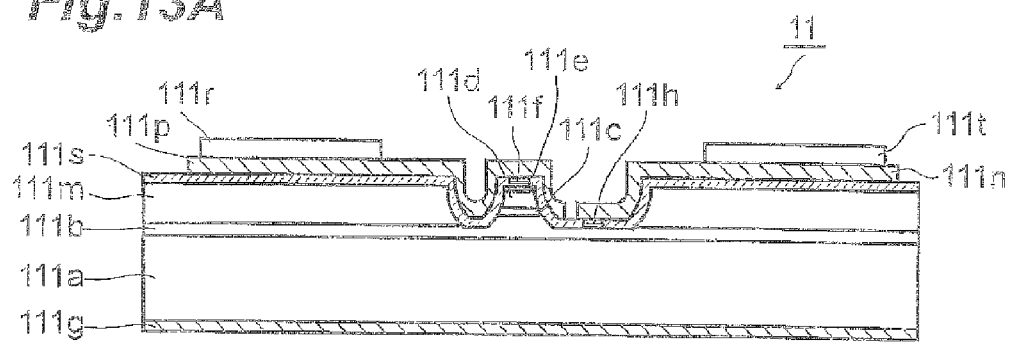
FIG. 13A shows a cross section of the LD implemented within the transmitter module.
Figure 13B:
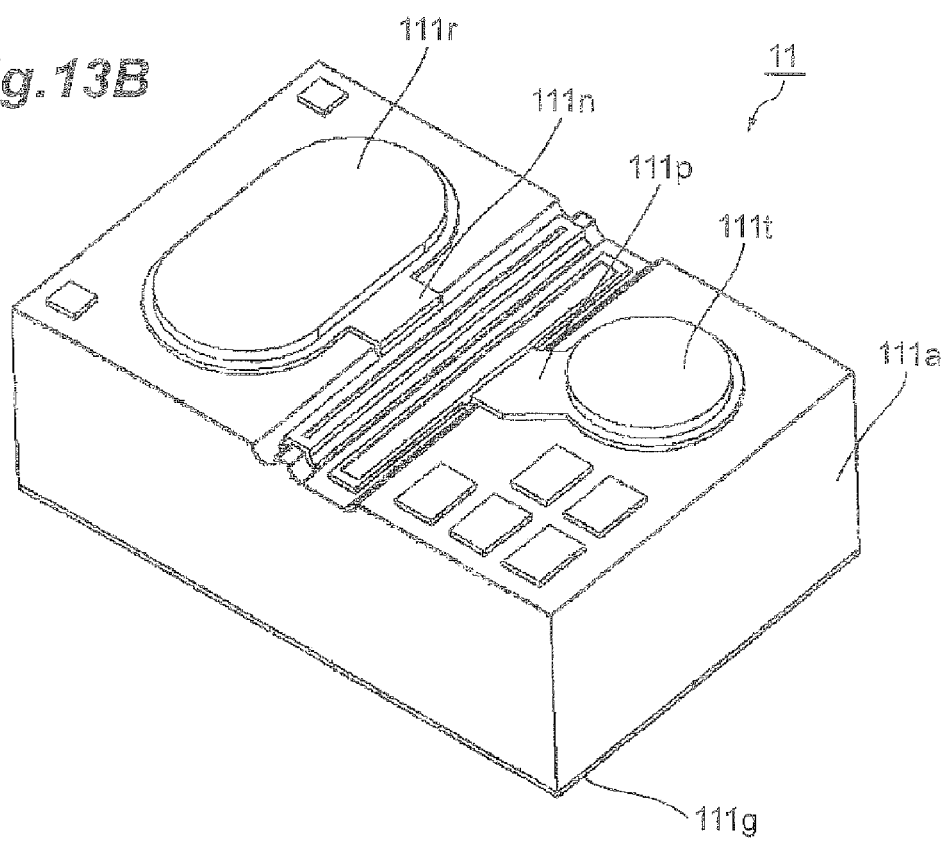
FIG. 13B shows an outer appearance of the LD.

Next, the assembly around the LDs 11 will be further specifically described as referring to FIGS. 13 to 16, where FIG. 13A schematically shows a cross section of the LD 11 implemented within the transmitter module 1, FIG. 13B shows an outer appearance of the LD 11. The LD 11 of the present application is specifically designed for the shunt-driving configuration.

Referring to FIG. 13A, the LID 11 has the type of the buried hetero-structure (BH) including, on a semiconductor substrate 111a, a lower cladding layer 111b, an active layer 111c, an upper cladding layer 111d, and a contact layer 111e. These layers, 111b to 111e, are epitaxially grown on the semiconductor substrate 111a, and form a mesa structure. Accordingly, the active layer 111c has a limited width. Both sides of the mesa structure are buried by the embedding layer 111m, This structure effectively confines the light generated in the active layer 111c by injecting the bias current therein. The embedding layer 111m has two grooves in respective sides of the mesa structure. Whole of the top surface of the LD 11 is covered by an insulating film 111s, which is often called as the passivation layer and typically made of silicon nitride (SiN). The insulating film 111s in the top of the mesa and the bottom of one of the grooves are removed to form openings, and respective ohmic metals, 111f and 111h, are filled within the opening so as to be in contact with the layers, 111e and 111b, underneath respective openings.

The ohmic metal 111f on the top of the mesa structure is extracted by the interconnection 111p, while, the ohmic metal 111h in the bottom of the groove is extracted by the interconnection 111n. The interconnections, 111p and 111n, each runs onto the insulating film 111s and come in contact with respective pads, 111r and 111t. The LD 11 also provides the back metal 111g in the back surface of the substrate 111a. Because the lower cladding layer 111b and the substrate 111a are highly doped which means that the back metal 111g and one of the ohmic metal 111h are under substantially same potential. This structure of the LD 11 shown in FIG. 13A makes it possible to extract the cathode not only from the back metal 111g of the substrate 111a but the top surface of the LD 11. As shown in FIG. 13B, the LD 11 of the embodiment provides two pads, 111r and 111t, in the top surface thereof, where one of the pads 111r is connected to the top electrode 111f of the mesa as the anode electrode, while, the other pad 111t is connected to the electrode 111h in the bottom of the groove as the cathode electrode. In addition, the former pad 111r has an extended circular shape to facilitate the wire-bonding of two wires, one is from the bias supply and the other comes from the driver 23.

Figure 14:
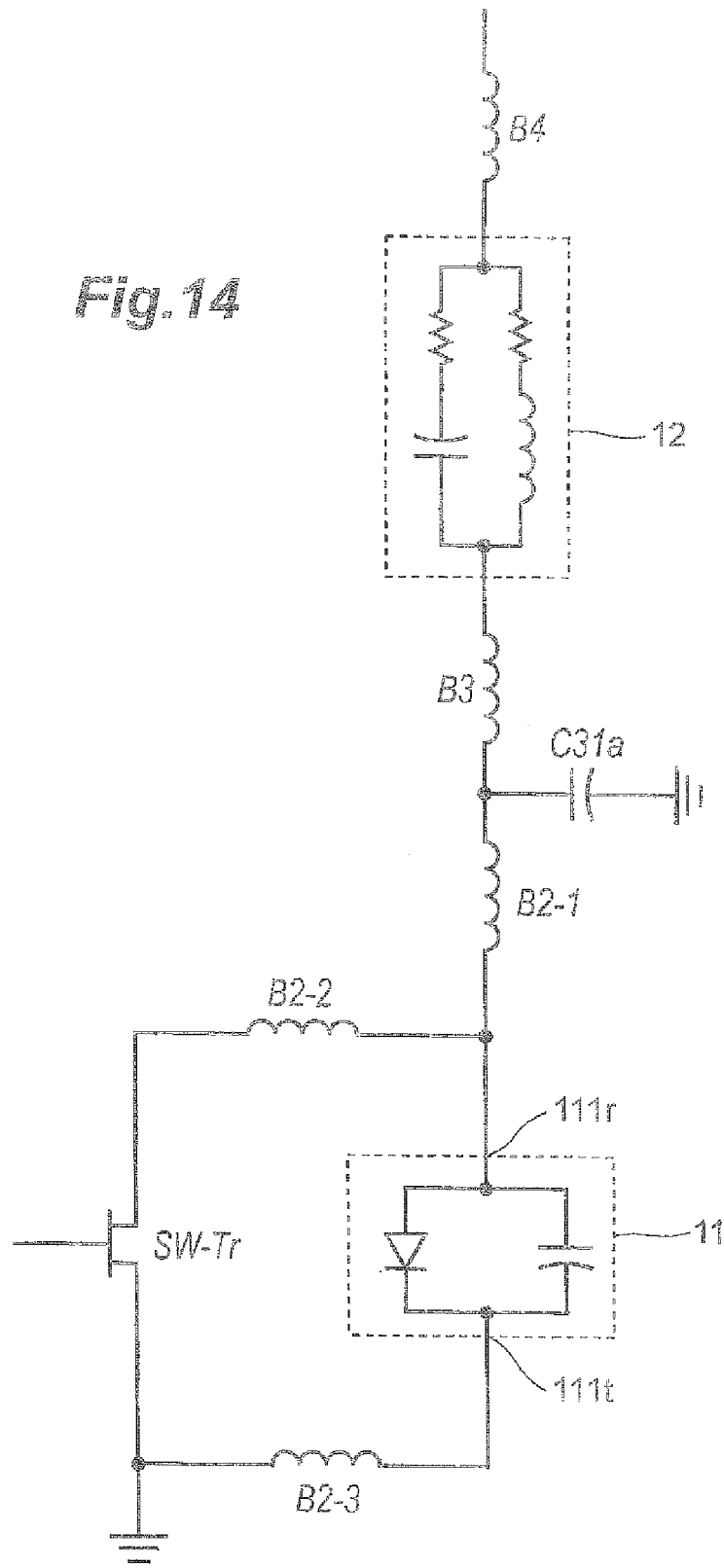
FIG. 14 is a circuit diagram including parasitic components of the shunt-driving configuration.

FIG. 14 schematically illustrates the shut-driving circuit, where some parasitic components are explicitly included in the circuit diagram. The shunt-driving circuit has a feature that the current switching element, namely, a transistor SW-TR, and the LD 11 are connected in parallel with respect to the bias current source connected to the inductor 12. When the transistor turns on by the driving signal, the current coming from the bias current source substantially flows in the switching transistor, which means that almost no current flows in the LID 11. On the other hand, when the transistor turns off, a substantial component of the bias current flows in the LD 11. Thus, the LD 11 is modulated by the driving signal.

Parasitic inductors attributed to the bonding wires, B2-1 to B4, and capacitors C31a due to the relay pad 31a on the LD sub-mound 31 are necessary to be taken into account when the LD 11 is driven by the RF signal whose frequency reaches and sometimes exceeds 10 Gbps. The bias current coming from the current source first flows in the bonding wire B4 connecting the DC terminals 24 to the pads 25a on the top carrier 25, then, flowing in the inductors 12 mounted on the top carrier 25. Although the pads 25a and the interconnections 25b on the top carrier 25 inherently show parasitic capacitance with respect to the chassis ground, many components such as the TEC 17, the carrier 32, the IC sub-mount 30, the driver 23, the spacer 28, and the top carrier 25, are stacked between the top surface of the top carrier 25 and the chassis. In addition, the bias current is inherently DC signal. Accordingly, the parasitic capacitance for the elements on the top carrier 25 may be substantially ignorable.

Passing through the inductor 12, the current flows in the bonding wire B3 connecting the interconnections 25b on the top carrier 25 with the relay pads 31a on the LD sub-mount 31, where the relay pads 31a inherently has capacitance C31a against the chassis ground. The LD sub-mount 31 is mounted on the carrier 32, and the carrier 32 is mounted on the TEC 17. Accordingly, an arrangement similar to that for the inductor 12 on the top carrier 25 is realized for the relay pads 31a. However, because the driving signal passes the relay pads 31a, even a faint parasitic capacitance affects the high frequency performance of the LD 11. As shown in FIG. 11, the relay pads 31a on the LD sub-mount 31 are wire-bonded to the anode electrode 111r of the LDs 11 with the bonding wire B2-1. As shown in FIG. 13B, The electrode 111r has the extended circular shape. The bonding wire B2-1 is bonded in a half portion of the electrode 111r, while, the rest portion thereof is also bonded with the bonding wire B2-2 connecting the electrode 111r of the LD 11 with the pad 23b on the driver 23. Moreover, the other electrode 11 it also provided on the top of the LD 11 is wire-bonded to the pad 23b of the driver 23. The electrode 111t corresponds to the cathode electrode of the LD 11, and the cathode is grounded through the bonding wire B2-2 as shown in FIG. 14, but the ground is taken within the driver 23 not around the LD 11.

It is conventionally a common sense or an invariably law that the ground interconnection is thick and short as possible. The present arrangement around the LD 11 that the cathode ground of the LD 11 is connected to the driver 23 with a slim bonding wire not connected around the LD 11. This is because of the configuration that the transmitter module 1 of the present embodiment installs a plurality of LDs 11, where a channel cross-talk between LDs 11 becomes sensitive. When the cathode grounds for respective LDs 11 are common, the cross-talk through the common ground becomes fatal reason to degrade the performance of the transmitter module 1. Accordingly, in the present embodiment of the transmitter module 1, the cathode grounds of respective LDs 11 are independently drawn within the driver 23. As shown in FIG. 11, the embodiment installs only two LD sub-mounts 31, that is, two LDs 11 are commonly mounted on the single LD sub-mount 31, which may cause a crosstalk between two LDs 11. However, the pads 31b for the LDs 11 on the LD sub-mount 31 are fully isolated and the LD sub-mount 31 itself is made of aluminum nitride (AlN). Accordingly, the crosstalk between two LDs 11 becomes substantially ignorable.

Moreover, as shown in FIG. 16, the carrier 32 that mounts the LD sub-mount 31 provides four pads 32d for the LD sub-mount 31, where two pads 32d in the left side are commonly provided for one LD sub-mount 31 and rest two pads 32d in the right side are commonly provided for the other LD sub-mount 31. One feature of the carrier 32 of the present embodiment is that the carrier 32 provides a groove 32c between two pads 32d in the right side and another groove 32c between two pads 32d in the left side. The pads 32d putting respective grooves 32c are for a portion mounting one of the LDs 11 and a portion mounting another one of the LDs 11. Even when the excessive conductive adhesive to mount the LD sub-mount 31 on the pad 32d oozed out from the pads 32d and the pads provided in the back surface of the LD sub-mount 31, the grooves 32c may receive the oozed adhesive. Accordingly, the isolation between pads in the back surface of the LD sub-mount 31 and the pads 32d on the carrier 32 for the LD sub-mount 31. The carrier 32 may provide another grooves, 32a and 32b, where they have an object same with above to absorb oozed adhesive.

FIGS. 15A and 15B show other arrangements around the LD sub-mount 31. As described, in the present transmitter module 1, the cathode ground of the LDs 11 are drawn within the driver 23 not grounded around the LDs 11. The arrangement shown in FIG. 11 provides only one bonding wire B2-3 connecting the cathode pad 1ilt with the ground pad of the driver 23. The LD 11, as shown in FIGS. 13A and 13B, provides the back metal 111g connected to the cathode pad 111t on the top surface thereof. The modified arrangements shown in FIGS. 15A and 15B utilize the back metal 111g. That is, the arrangement shown in FIG. 15A wire-bonds the die-pad 31b, which is provided on the top of the LD sub-mount 31 and connected to the back metal 111g of the LD 11, to the ground pads 23b of the driver 23. In this arrangement, the bonding wire B2-2 which carries the modulating signal is put between two ground wires B2-3, which equivalently emulates the coplanar line and secures the transmission characteristics of the RF signal propagating on the bonding wire B2-2. The arrangement shown in FIG. 15B further strengthens the ground performance. That is, the die-pad 31b on the LD sub-mount 31 is bonded to the pads 23b on the driver 23 with two bounding wires B2-3, and the cathode electrode 1ilt on the top of the LD 11 is also wire-bonded to the pads 23b with two bonding wires B2-3. The pad 111t is bonded in duplicate.

While particular embodiments of the present embodiment have been described herein for purposes of illustration, many modifications and changes will become apparent to those skilled in the art. Accordingly, the appended claims are intended to encompass all such modifications and changes as falling within the true spirit and scope of this invention.

What is claimed is:

1. A transmitter module, comprising:
   a plurality of laser diodes (LDs) each emitting an optical beam attributed to a wavelength specific thereto and different from others;
   a driver that includes a plurality of driving circuits corresponding to respective LDs, the driving circuits driving the respective LDs, the driver having RF pads and DC pads;
   a top carrier that mounts a plurality of inductors each providing bias currents to respective LDs, the top carrier being mounted on the driver as interposing a spacer therebetween; and
   a box-shaped housing for enclosing the LDs, the driver, and the top carrier therein,
   wherein the box-shaped housing provides RF terminals and DC terminals commonly in a side wall of the box-shaped housing, and
   wherein the driver has a square plane shape with four edges, one of the four edges facing the side wall and another one of the four edges extending in parallel to the one of the four edges providing only the RF pads, two of the four edges intersecting the one of the four edges and the another one of the four edges providing only the DC pads.

2. The transmitter module of claim 1,
   wherein the bias currents are provided from the DC terminals in the side wall through bonding wires connecting the DC terminals and interconnections formed on the top carrier, the respective inductors provided on the top carrier breaking the interconnections into respective two portions, and another bonding wires connecting respective one of the broken interconnections with the respective LDs.

3. The transmitter module of claim 1,
   wherein the driver includes interconnections connecting the RF pads formed along the one of the four edges facing the side wall to the respective driving circuits formed close to the another one of the four edges of the driver,
   wherein the RF terminals in the side wall provide respective RF signals to the driving circuits through bonding wires connecting the RF terminals to the RF pads and the interconnections, and the driving circuits provide the RF signals through the RF pads formed along the another one of the four edges to the directly respective LDs.

4. The transmitter module of claim 1,
   further comprising a wiring substrate disposed in a side facing the edge intersecting the one of the four edges and the another one of the four edges of the driver,
   wherein the wiring substrate is electrically connected to the DC terminals provided in the side wall with bonding wires not intersecting a space above the driver.

5. The transmitter module of claim 1,
   further comprising two wiring substrates each disposed in respective sides facing the edges intersecting the one of the four edges and the another one of the four edges of the driver, the wiring substrates arranging the driver therebetween,
   wherein the wiring substrates are electrically connected to the DC terminals provided in the side wall with bonding wires not intersecting a space above the driver.

6. The transmitter module of claim 1,
   wherein the side wall includes a plurality of ceramics layers, one of ceramic layers providing the RF terminals in a top surface thereof in the box-shaped housing and another one of ceramic layers stacked on the one of ceramic layers providing the RF terminals in a bottom surface thereof outside of the box-shaped housing, the RF terminals in the box-shaped housing being connected with the RF terminals outside of the box-shaped housing without passing any via-holes.

7. The transmitter module of claim 6,
wherein the RF terminals in the box-shaped housing collectively have a horizontal level slightly lower than a horizontal level of a top surface of the driver, and the horizontal level of the top surface of the driver is substantially equal to or slightly higher than a horizontal level of a top surface of the LDs.

8. A transmitter module, comprising:
a plurality of laser diodes (LDs) each emitting an optical beam attributed to a wavelength specific thereto and different from others;
a driver that includes a plurality of driving circuits corresponding to respective LDs, the driving circuits driving the respective LDs;
a top carrier that mounts a plurality of inductors each providing bias currents to respective LDs, the top carrier being mounted on the driver as interposing a spacer therebetween; and
a box-shaped housing for enclosing the LDs, the driver, and the top carrier therein, the box-shaped housing enclosing an IC sub-mount that mounts the driver thereon, a carrier that mounts the IC sub-mount thereon, and a thermoelectric cooler (TEC) that mounts the carrier thereon,
wherein the top carrier is disposed on a stack formed by the carrier, the IC sub-mount, the driver, and the spacer.

9. The transmitter module of claim 8,
wherein the spacer has thermal expansion co-efficient substantially same with thermal expansion co-efficient of the driver.

10. The transmitter module of claim 9,
wherein the top carrier is made of silicon oxide ($SiO_2$), the spacer is made of one of silicon (Si) and aluminum nitride (AlN), and the IC sub-mount is made of aluminum nitride (AlN).

11. A transmitter module, comprising:
a laser diode (LD) including a cathode electrode and an anode electrode, the cathode electrode being exposed in a top surface of the LD;
a driver having a signal pad and at least two ground pads;
a LD sub-mount made of electrically insulating material, the LD sub-mount having a relay pad for relaying a bias current to the LD and a die pad for die-bonding the LD thereon; and
a housing for enclosing the LD, the driver, and the LD sub-mount therein, the housing providing a chassis ground,
wherein the anode electrode of the LD is wire-bonded to the signal pad of the driver through the relay pad on the LD sub-mount, and the cathode electrode of the LD is directly wire-bonded to the one of the ground pads of the driver without being connected to the chassis ground of the housing.

12. The transmitter module of claim 11,
wherein the LD has a back electrode substantially short-circuited to the cathode electrode within the LD, the back electrode being directly in contact with the die pad on the LD sub-mount, and
wherein the die pad on the LD sub-mount is wire-bonded to another of the ground pads of the driver.

13. The transmitter module of claim 11,
wherein the die pad on the LD sub-mount and the cathode electrode of the LD are doubly wire-bonded to the respective ground pads of the driver.

14. The transmitter module of claim 11,
further comprising another LD driven independently of the LD,
wherein the LD sub-mount commonly mounts the LD and the another LD thereon as maintaining electrical isolation between the LD and the another LD.

15. The transmitter module of claim 14,
further comprising a carrier,
wherein the LD sub-mount includes a first portion for mounting the LD thereon and a second portion for mounting the another LD thereon, and
wherein the carrier has a first pad for bonding the first portion of the LD sub-mount thereto, a second pad for bonding the second portion of the LD sub-mount thereto, and a groove for dividing the first pad from the second pad.

* * * * *